United States Patent
Mori et al.

(10) Patent No.: US 6,913,300 B2
(45) Date of Patent: Jul. 5, 2005

(54) BUMPER STRUCTURE FOR A MOTOR VEHICLE

(75) Inventors: Takeshi Mori, Nakano-ku (JP); Nobuhiro Yoshimura, Nakano-ku (JP); Keiichi Nakagawa, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/739,174

(22) Filed: Dec. 19, 2003

(65) Prior Publication Data

US 2004/0130167 A1 Jul. 8, 2004

(30) Foreign Application Priority Data

Dec. 19, 2002 (JP) ........................................ 2002-368282

(51) Int. Cl.[7] .............................................. B60R 19/03
(52) U.S. Cl. ....................................... 293/120; 293/133
(58) Field of Search ................................ 293/102, 120, 293/132, 133, 136; 296/187.03, 187.09

(56) References Cited

U.S. PATENT DOCUMENTS

| | | | | | |
|---|---|---|---|---|---|
| 3,917,332 | A | * | 11/1975 | Puleo ........................ | 293/120 |
| 6,106,039 | A | * | 8/2000 | Maki ......................... | 293/132 |
| 6,308,999 | B1 | | 10/2001 | Tan et al. | |
| 6,406,081 | B1 | * | 6/2002 | Mahfet et al. .............. | 293/120 |
| 6,428,065 | B2 | * | 8/2002 | Sato et al. .................. | 293/120 |
| 6,575,510 | B2 | * | 6/2003 | Weissenborn ............... | 293/120 |
| 2003/0189344 | A1 | * | 10/2003 | Evans ....................... | 293/120 |

FOREIGN PATENT DOCUMENTS

| | | | |
|---|---|---|---|
| DE | 003623150 A1 * | 2/1988 | ................. 293/132 |
| DE | 198 06 541 | 9/1998 | |
| EP | 1 046 546 | 10/2000 | |
| GB | 2 322 602 | 9/1998 | |

* cited by examiner

Primary Examiner—Lori L. Coletta
(74) Attorney, Agent, or Firm—Wenderoth, Lind & Ponack, L.L.P.

(57) ABSTRACT

A bumper structure comprise a bumper reinforcement, a bumper fascia extending along and located in front of the bumper reinforcement, and an impact absorber arranged between the bumper reinforcement and the bumper fascia. The bumper reinforcement extends in a lateral direction of a vehicular body and attached to the vehicular body. The bumper reinforcement has a front surface, stepped or tapered in shape, so that the bumper reinforcement retreats at a lower portion thereof more than at an upper portion thereof. The impact absorber has upper and lower portions so that the lower portion thereof is longer and stronger than the upper portion thereof. The impact absorber has a rear surface, stepped or tapered in shape, such that the rear surface of the lower portion projects toward the bumper reinforcement with respect to the rear surface of the upper portion so as to face the front surface of the bumper reinforcement.

20 Claims, 6 Drawing Sheets

BUMPER STRUCTURE FOR A MOTOR VEHICLE

BACKGROUND OF THE INVENTION

1. Field of the Invention

The present invention relates to a bumper structure for a motor vehicle, particularly to the bumper structure with an impact absorber arranged between a bumper reinforcement and a bumper fascia for reducing impact energy applied to a pedestrian involved in a collision with a motor vehicle.

2. Description of the Related Art

A bumper structure for a motor vehicle of this kind is disclosed in, for example, Japanese patent laying-open publication Tokkai 2002-144988, particularly shown in its FIGS. 2 and 5. This bumper structure is constituted of a bumper reinforcement, also called as a bumper armature or a bumper beam, attached to a front end portion of a vehicular body, a bumper fascia located in front of the bumper reinforcement, and an impact absorption member arranged between the bumper reinforcement and the bumper fascia.

The bumper reinforcement extends in a lateral direction of the vehicular body and has a stepped or tapered front surface, in cross-section, such that its upper portion retreats in a longitudinal direction of the vehicular body with respect to its lower portion. The impact absorption member has a flat front surface to be fitted to an inner side of the bumper fascia, and a stepped or tapered rear surface, in cross-section, to mate with the front surface of the bumper reinforcement such that its upper portion retreats rearward in the longitudinal direction with respect to its lower portion. This results in the impact absorption member is constructed so that its lower portion is shorter in the longitudinal direction than is its upper portion.

In this conventional bumper structure, when a motor vehicle collides with a pedestrian, impact force is applies to legs of the pedestrian and the bumper structure. By the impact force, the impact absorption member is pressed and deformed in the longitudinal direction while absorbing impact energy and thereby decreases damage to legs of the pedestrian. Specially, during this collision, upper and lower portions of the impact absorption member are deformed to absorb the impact energy, and amounts of their compressive deformations are different from each other, because the lower portion is formed smaller in the longitudinal direction than the upper portion. This results in the upper portion being deformed to retreat backward of the vehicular body to a greater extent than the lower portion, which prevents knees of the pedestrian from being bent toward a direction opposite to their natural bending direction, and broken. The impact absorption member, therefore, reduces damage to a pedestrian's lower legs to a minimum.

The above known conventional bumper structure, however, encounters a problem in that because the upper portion and the lower portion, smaller in the longitudinal direction than the upper portion, of the impact absorption member are different from each other in terms of maximum amounts of compressive deformations, the maximum (limit) deformation amount of the lower portion is attained earlier and is smaller than that for the upper portion, thereby causing lower legs of a pedestrian during a collision with a motor vehicle to encounter much damage such as bone fracture and the like.

It is, therefore, an object of the present invention to provide a bumper structure for a motor vehicle which overcomes the foregoing drawbacks and can prevent a pedestrian from being caught under the motor vehicle, and improve protection of the pedestrian, during a collision with the motor vehicle, against damage to his or her legs, particularly lower legs and knees, such as knee-bending against their natural bending direction, bone fracture of the lower legs and the like.

SUMMARY OF THE INVENTION

According to the first aspect of the present invention, there is provided a bumper structure for a motor vehicle comprising: a bumper reinforcement extending in a lateral direction of a vehicular body and attached to the vehicular body and having a front surface; a bumper fascia located in front of and extending along the bumper reinforcement; and an impact absorber arranged between the bumper reinforcement and the bumper fascia, and having a rear surface to face the front surface of the bumper reinforcement, with the impact absorber being deformable in a longitudinal direction of the vehicular body so as to absorb impact energy; wherein the impact absorber is formed to be longer at a lower side of the impact absorber than at an upper side of the impact absorber and to be stronger at the lower side than at the upper side.

In this bumper structure of the invention, when the motor vehicle comes into a collision with a pedestrian, the bumper fascia strikes the pedestrian's lower legs. This collision impact is transmitted to the impact absorber through the bumper fascia. The impact acts to press and deform the impact absorber in the longitudinal direction of the vehicular body, which absorbs the impact energy. During this impact energy absorption, because the impact absorber is stronger at the lower side than at the upper side, cause is a strong reaction against impact force. Consequently, this reaction acts as a turning force to move the lower legs of the pedestrian in a forward direction of the motor vehicle in such a way that they are bent in their natural bending direction around the knees, also protecting the pedestrian from being caught under the motor vehicle. In addition, because the impact absorber is longer in the longitudinal direction at the lower side than at the upper side, the lower side of the impact absorber is still deformable without its steeply increasing reaction force even when the deformation of the upper side of the impact absorption member reaches its deformation limit, which can prevent the pedestrian's lower legs from damage such as bone fracture.

Preferably, the front surface of the bumper reinforcement has a stepped shape in cross-section that retreats reward in the longitudinal direction at a lower portion of the front surface with respect to an upper portion of the front surface, and the impact absorber is composed of a first impact absorption member and a second impact absorption member located under the first impact absorption member, with the first and second impact absorption members each having a flat rear surface that face the front surface of the bumper reinforcement, with the second absorption member being longer than the first impact absorption member and projecting toward the bumper reinforcement with respect to the rear surface of the first impact absorption member, and the second absorption member being stronger in the longitudinal direction than is the first impact absorption member.

Because the impact absorber is composed of the first and second impact absorption members, these first and second impact absorption members can be made of materials different from each other so as to have different strength in the longitudinal direction without difficulty.

Alternatively, the front surface of the bumper reinforcement has tapered shape in cross-section that gradually retreats in the longitudinal direction from an upper portion of the front surface to a lower portion of the front surface, and the impact absorber is composed of a first impact absorption member, and a second impact absorption member located under the first impact absorption member, the first and second impact absorption members each having a tapered rear surface to face the front surface of the bumper reinforcement, with the second absorption member being longer than the first impact absorption member and projecting toward the bumper reinforcement with respect to the rear surface of the first impact absorption member, and with the second absorption member being stronger in the longitudinal direction than the first impact absorption member.

Because the impact absorber is composed of the first and second impact absorption members, these first and second impact absorption members can be made of materials different from each other to have different strength in the longitudinal direction without difficulty.

Preferably, the first impact absorption member and the second impact absorption member are formed to be integral with each other by double injection molding.

Because the first and the second impact absorption members are formed to be integral with each other by double injection molding, a number of parts and assembling process steps of the bumper structure can be reduced.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
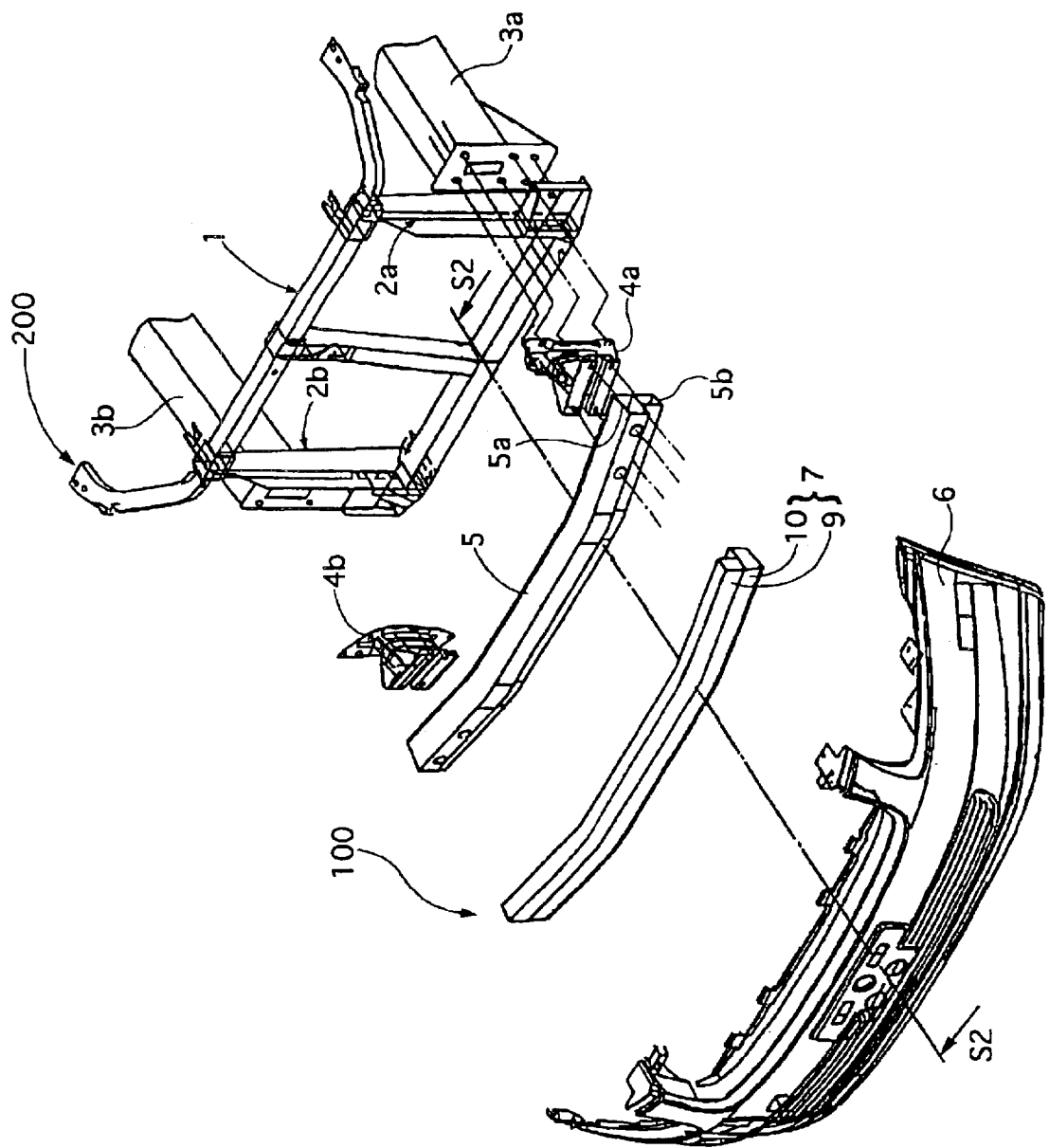
FIG. 1 is an exploded perspective view of a bumper structure for a motor vehicle of a first preferred embodiment according to the present invention, and a front end portion of a vehicular body to which the bumper structure is attached.

Throughout the following detailed description, similar reference characters and numbers refer to similar elements in all figures of the drawings.

At first, a first preferred embodiment of the invention will be described in detail according to the drawings.

Figure 2:
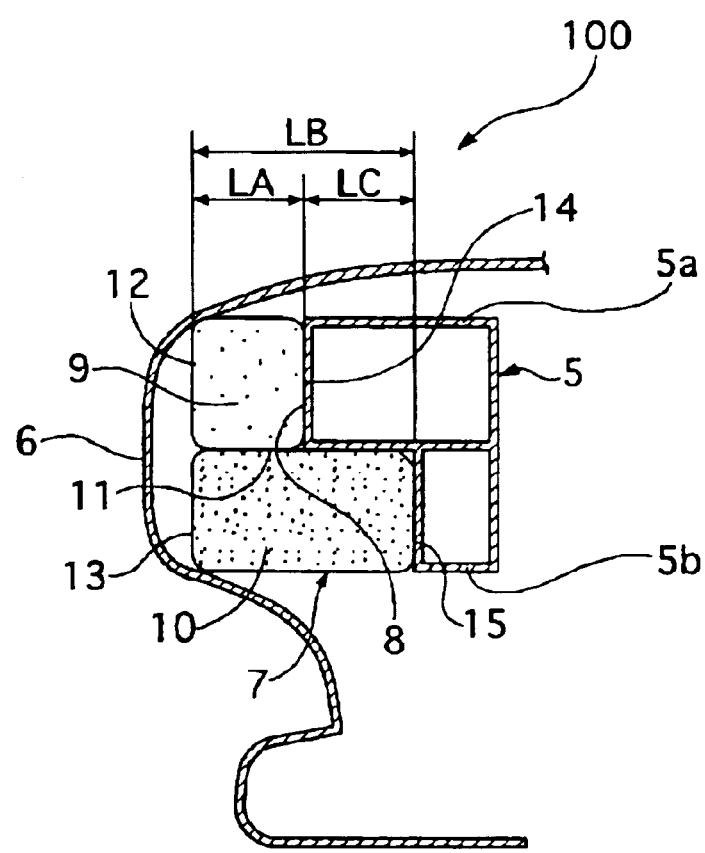
FIG. 2 is an enlarged side view in cross-section taken along line S2—S2 in FIG. 1 of the bumper structure of the first preferred embodiment according to the present invention.
Figure 3:
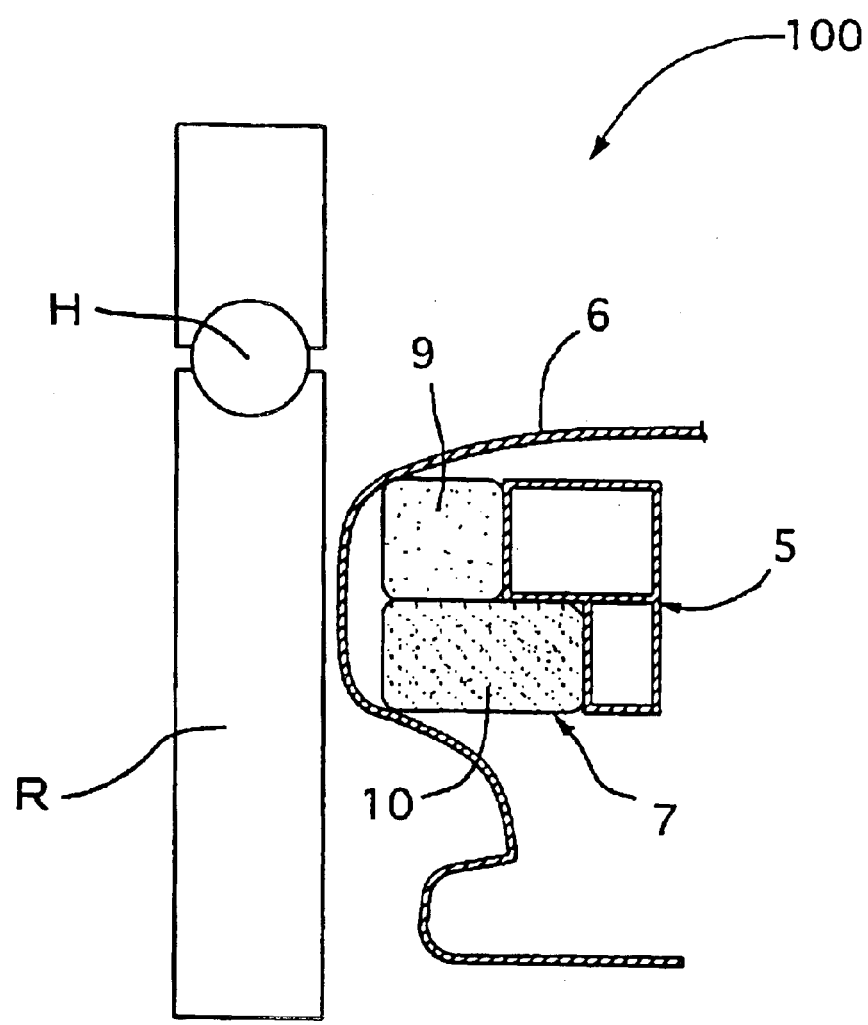
FIG. 3 is a schematic diagram showing a relationship between a pedestrian's legs and the bumper structure of the first embodiment just before a motor vehicle strikes against the pedestrian.
Figure 4:
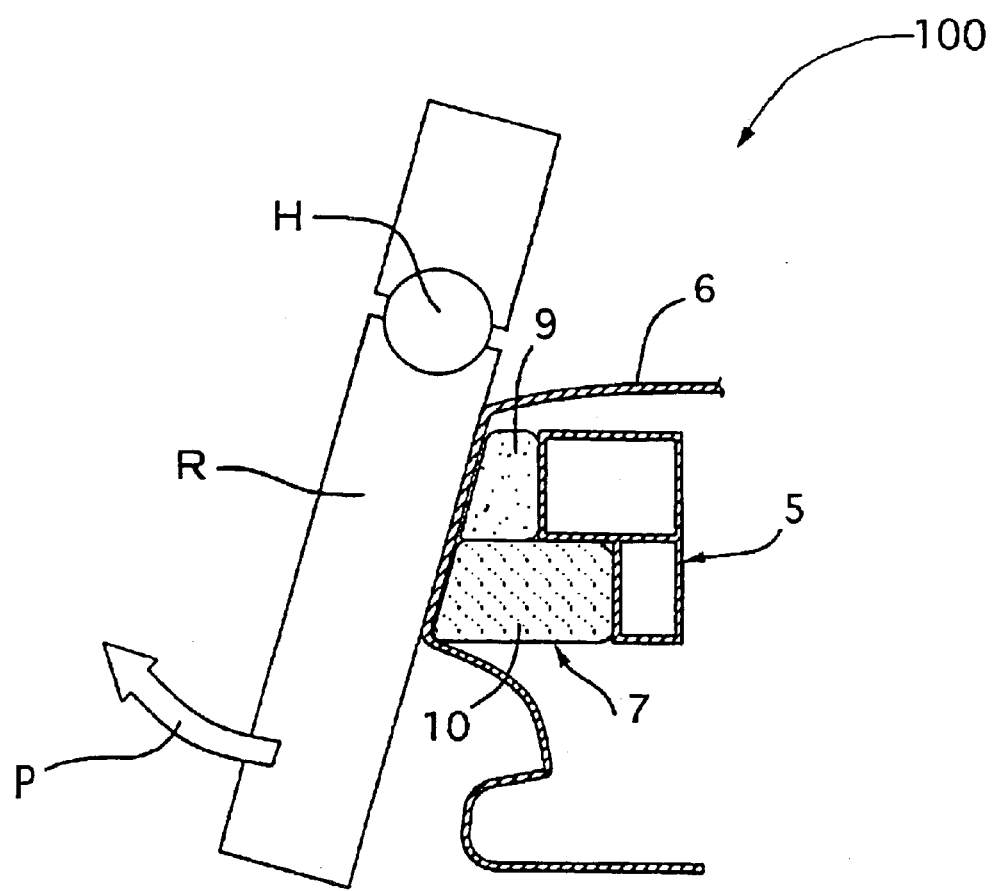
FIG. 4 is a schematic diagram showing a relationship between the pedestrian's legs and the bumper structure of the first embodiment during a collision between the motor vehicle and the pedestrian after the state of FIG. 3.

FIG. 1 shows an exploded perspective view of a bumper structure of the first embodiment of the invention and a front end portion of a vehicular body to which the bumper structure is attached, FIG. 2 shows an enlarged sectional side view of the bumper structure in cross-section taken along the line S2—S2 in FIG. 1 of the first embodiment, and FIGS. 3 and 4 show a schematic diagram representing a relationship between a pedestrian's legs and the bumper structure according to the first embodiment just before and when a motor vehicle comes into a collision with the pedestrian respectively.

Referring to FIGS. 1 and 2, a bumper structure 100 for a motor vehicle according to the first preferred embodiment is located in front of and attached to a vehicular body 200.

The vehicular body 200 is provided with left and right side members 3a and 3b extending in a longitudinal direction of the vehicular body 200 at the left and right side of the vehicular body 200 and a radiator core support 1 formed to have the shape of a framed rectangle and including left and right radiator core side members 2a and 2b which are bolted to the front end portions of the left and right side members 3a and 3b respectively.

The bumper structure 100 comprises a bumper reinforcement 5 made of metal sheet and extending in a lateral direction of the vehicular body 200, a bumper fascia 6 formed of resins and located in front of the bumper reinforcement 5 to extend along the bumper reinforcement 5 and cover the bumper reinforcement 5 in it; and an impact absorber 7 arranged between the bumper reinforcement 5 and the bumper fascia 6.

The bumper reinforcement 5 is attached by bolts, not shown, at its left and right end portions to the left and right side members 3a and 3b through left and right bumper stays 4a and 4b respectively. The bumper reinforcement 5 has an upper portion 5a and a lower portion 5b, which are formed to each have a rectangular closed sectional shape. The upper potion 5a is set to be longer in the longitudinal direction than the lower portion 5b so that the upper portion 5a projects forward with respect to the lower portion 5b. The bumper reinforcement 5 has a stepped front surface 8 and a flat rear surface.

The impact absorber 7 is composed of a first impact absorption member 9 and a second impact absorption member 10 located under the first impact absorption member 9, which are adhered to each other at their mating faces 11.

A length LA of the first impact absorption member 9 is set to be shorter in the longitudinal direction than a length LB of the second impact absorption member 10 by a length LC so that the rear portion of the second impact absorption member 10 projects rearward with respect to a rear surface of the first impact absorption member 9.

Moreover, the second impact absorption member 10 is made of a material stronger than first impact absorption member 9 so that the second impact absorption member 10 applies a stronger reaction than that of the first impact absorption member 9.

The first and second impact absorption members 9 and 10 are arranged so that their respective front surfaces 12 and 13 are in contact with the rear surface of the bumper fascia 6, and so that their respective rear surfaces 14 and 15 are mated with and fixed to the stepped front surface 8 of the bumper reinforcement 5.

Next, an operation and advantages of the bumper structure 100 of the first embodiment will be described with reference to FIGS. 3 and 4.

FIG. 3 shows a relationship with a pedestrian and the motor vehicle with the above constructed bumper structure 100 just before a collision between the pedestrian and the bumper structure, FIG. 4 shows a relationship with the pedestrian and the motor vehicle during a collision between the pedestrian and the bumper structure.

When the motor vehicle comes into contact with the pedestrian just after the state of FIG. 3, the bumper fascia 6 strikes his or her lower legs R. This impact force, applied to the bumper fascia 6 from the pedestrian, is transmitted to the impact absorber 7, i.e. both of the first and second impact absorption members 9 and 10 simultaneously.

As shown in FIG. 4, the impact force acts to press and deform the first and second impact absorption members 9 and 10 in the longitudinal direction of the vehicular body 200 through the bumper fascia 6, which absorbs impact energy sequentially as the compressive deformation of the first and second impact absorption members 9 and 10 progresses.

During this impact absorption, because the second impact absorption member 10 is made of a material stronger than that of the first impact absorption member 9, the second impact absorption member 10 is deformed less than the first impact absorption member 9 so as to cause a strong reaction against the impact force. Consequently, a reaction acts as a turning force P to move the lower legs R of the pedestrian in a forward direction of the motor vehicle in such a way that they are bent in their natural bending direction around his or her knees H.

Additionally, because the second impact absorption member 10 is longer in the longitudinal direction than the first impact absorption member 9, the second impact absorption member 10 is still deformable even when the deformation of the first impact absorption member 9 reaches its limit (maximum amount of the compressive deformation). The second impact absorption member 10, therefore, can continue to be deformed and absorb impact energy more than does the first impact absorption member 9, and applies the turning force P, which is not an excessive reaction force, to the lower legs R of the pedestrian after the first impact absorption member 9 reaches its deformation limit.

As described above, the bumper structure 100 of the first embodiment according to the invention has advantages such that the impact absorber 7 protects the pedestrian from being caught under vehicular body 200 and prevents the pedestrian's lower legs R and knees H from being injured, because the second impact absorption member 10 can be deformed more than the first impact absorption member 9, and applies the turning force P, i.e. a reaction force stronger than that applied by first impact absorption member 9, to the pedestrian's lower leg R in the forward direction of the motor vehicle. Moreover, the impact absorber 7 and the bumper reinforcement 5 have the stepped rear surface and the stepped front surface to mate with each other, which can allow the bumper structure 100 to be small in size in the longitudinal direction of the vehicular body 200.

Next, a second embodiment of the invention will be described with reference to FIG. 5.

Figure 5:
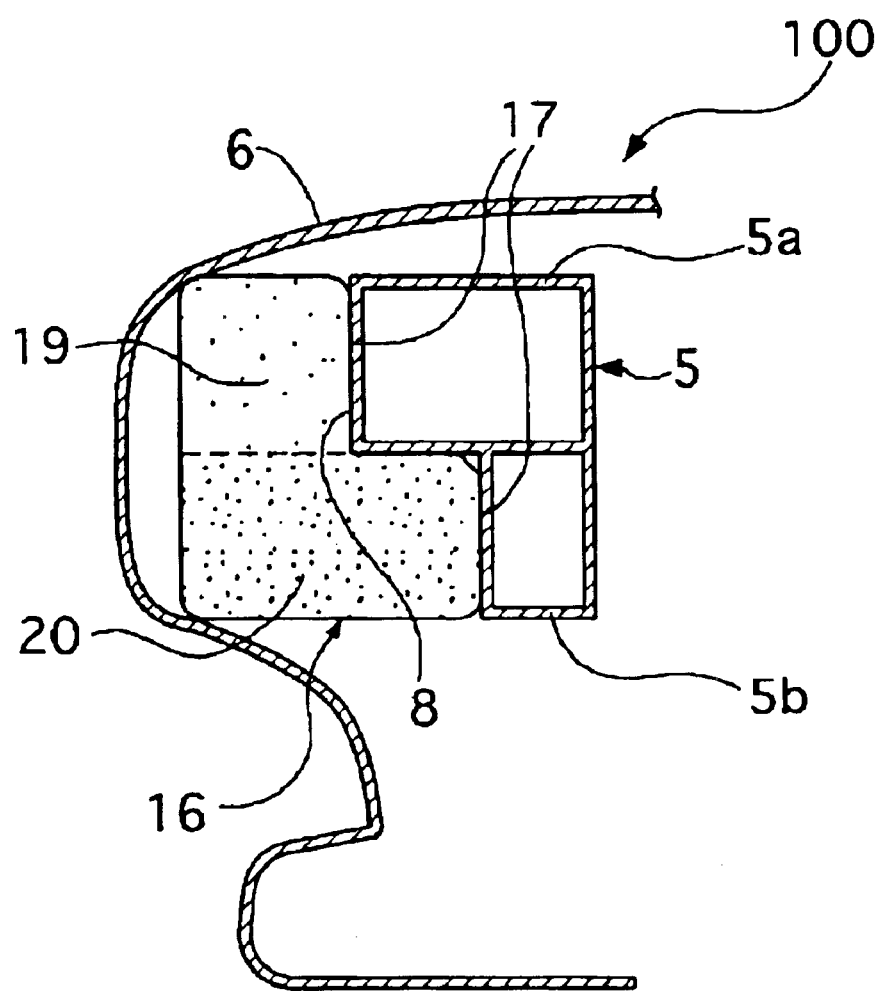
FIG. 5 is a sectional side view of a bumper structure of a second preferred embodiment according to the present invention.

Referring to FIG. 5, in a bumper structure 100 of the second embodiment, the first and second impact absorption members 9 and 10 of the first embodiment are integrally formed into an impact absorber 16 by an injection molding machine using double injection molding, and other parts are the same as those of the first embodiment described above, whose descriptions are omitted for eliminating duplication.

Specifically, the impact absorber 16 has a flat front surface and a stepped rear surface 17 to mate with a stepped front surface 8 of a bumper reinforcement 5. The impact absorber 16 has an upper portion 19 and a lower portion 20 longer in a longitudinal direction of a vehicular body and projecting backward of the vehicular body with respect to the rear surface of the upper portion 19. The upper portion 19 is made of low density polyprophylene foam, while the lower portion 20 is made of high density polyprophylene foam, resulting in that the lower portion 20 becomes stronger in the longitudinal direction and deformable to a greater extent than the upper portion 19.

An operation of this bumper structure 100 of the second embodiment is the same as that of the first embodiment, and its description is omitted.

As the impact absorber 16 is consisted of the upper portion 19 of low density polyprophylene foam and the lower portion 20 of high density polyprophylene foam that are integrally formed by double injection molding, this bumper structure 100 of the second embodiment has advantages in that a numbers of parts required and their assembling process steps are reduced, in addition to advantages of the first embodiment.

Next, a third embodiment of the invention will be described with reference to FIG. 6.

Figure 6:
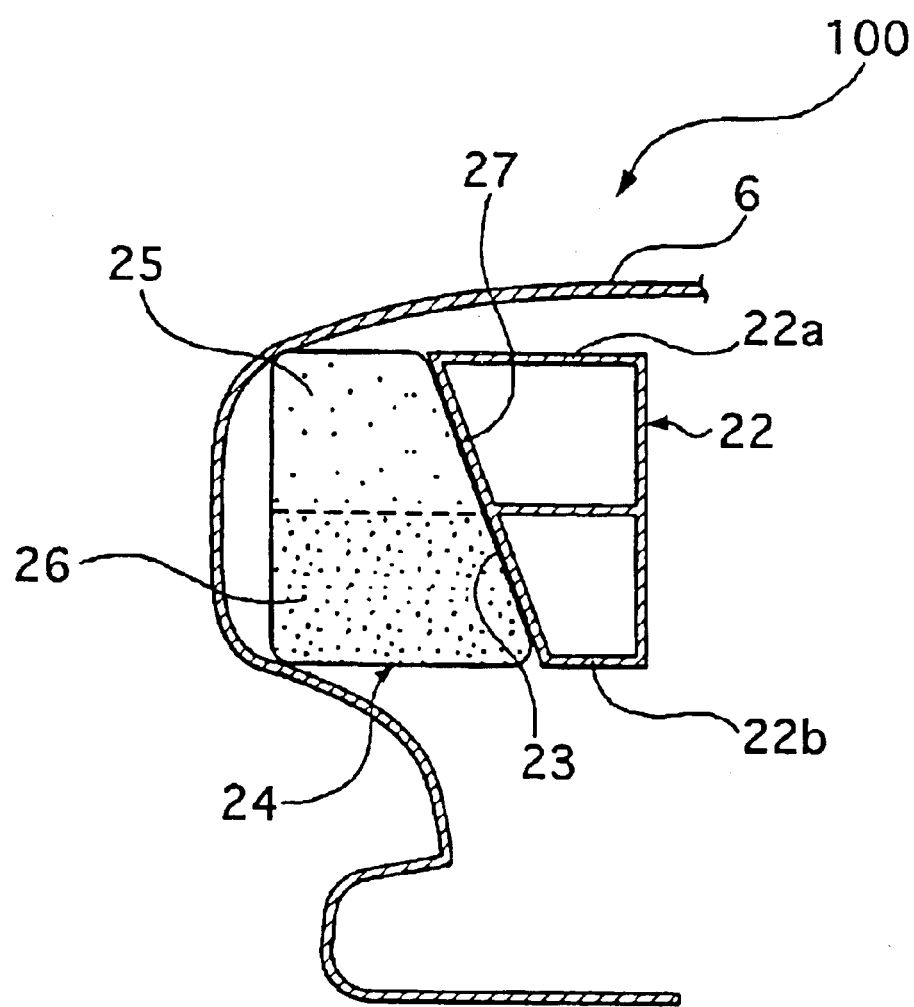
FIG. 6 is a sectional side view of a bumper structure of a third preferred embodiment according to the present invention.

Referring to FIG. 6, in a bumper structure 100 of the third embodiment, a front surface 23 of a bumper reinforcement 22 and a rear surface 27 of an impact absorber 24 are different from those of the first and second embodiments.

The bumper reinforcement 22 is made of metal sheet and has upper portion 22a and lower portion 22b integral with the upper portion 22a, which have closed sectional shapes, respectively. The bumper reinforcement 22 has a tapered front surface 23 that gradually retreats rearward towards an end side of the vehicular body from an upper side to a lower side of the bumper reinforcement 22.

The impact absorber 24 is made of polyprophylene foam and has an upper portion 25 and a lower portion 26, which are formed integrally with each other by performing double injection molding. The impact absorber 24 has a flat front surface in contact with an inner side surface of a bumper fascia 6, and a tapered rear surface 27 that gradually retreats forward towards an opposite end side of the vehicular body from a lower side to an upper side of the impact absorber 24 to mate with the front surface 23 of the bumper reinforcement 22. This results in strength of the impact absorber 24 gradually increasing from the upper side to the lower side of the impact absorber 24.

An operation and advantages of the bumper structure 100 of the third embodiment are substantially the same as those of the second embodiment, and their descriptions are omitted for eliminating duplication.

In the foregoing, embodiments of the invention have been described, but the present invention is not to be limited to the above-described embodiments of the invention, and design changes and so on without departing from the sprit of the present invention are to be embraced in the present invention.

For example, the impact absorbers 7, 16, and 24 may be made of material different from polyprophylene foam. For example, the impact absorbers 7, 16, and 24 can be made of anisotropic material, whose strength in the longitudinal direction of a vehicular body 200 has to be set beyond a predetermined strength.

It is not necessary to provide contact between the impact absorbers 7, 16, and 24 and the bumper fascia 6 or between the impact absorbers 7, 16, and 24 and the bumper reinforcements 5 and 22, when a collision has not yet occurred.

Instead of adaptation of the bumper structures 100 of the first to third embodiments to the front end side of the vehicular body 200, the same constructed bumper structure may be adapted to a rear end side of the vehicular body 200.

The entire contents of Japanese Patent Application Tokugan 2002-368282 (filed Dec. 19, 2002) is incorporated herein by reference.

What is claimed is:

1. A bumper structure for a motor vehicle, comprising:
a bumper reinforcement to extend in a lateral direction of a vehicular body when attached to the vehicular body, said bumper reinforcement having a front surface portion;
a bumper fascia located in front of and extending along said bumper reinforcement; and
an impact absorber between said bumper reinforcement and said bumper fascia, said impact absorber having a rear surface portion facing said front surface portion of said bumper reinforcement and being deformable in a longitudinal direction of the vehicular body, when said bumper reinforcement is attached to the vehicular body, so as to absorb impact energy,
wherein said impact absorber is
(i) longer at a lower side of said impact absorber than at an upper side of said impact absorber such that at said lower side said rear surface portion of said impact absorber projects rearwardly relative to said rear surface portion at said upper side, and
(ii) stronger at said lower side than at said upper side.

2. The bumper structure according to claim 1, wherein said front surface portion of said bumper reinforcement has a stepped cross-sectional shape that retreats in the longitudinal direction of the vehicular body, when said bumper reinforcement is attached to the vehicular body, at a lower side of said front surface portion relative to an upper side of said front surface portion, and
said impact absorber comprises a first impact absorption member and a second impact absorption member beneath said first impact absorption member, with said first and second impact absorption members each having a flat rear surface facing said front surface portion of said bumper reinforcement, with said second impact absorption member being longer than said first impact absorption member and projecting toward said bumper reinforcement relative to said flat rear surface of said first impact absorption member, and with said second impact absorption member being stronger than said first impact absorption member in the longitudinal direction of the vehicular body when said bumper reinforcement is attached to the vehicular body,
such that
(i) said flat rear surface of said first impact absorption member and said flat rear surface of said second impact absorption member define said rear surface portion of said impact absorber,
(ii) said impact absorber is longer at said lower side than at said upper side thereof, such that at said lower side said rear surface portion of said impact absorber projects rearwardly relative to said rear surface portion at said upper side, by virtue of said second impact absorption member being longer than said first impact absorption member and projecting toward said bumper reinforcement relative to said flat rear surface of said first impact absorption member, and
(iii) said impact absorber is stronger at said lower side than at said upper side thereof by virtue of said second impact absorption member being stronger than said first impact absorption member in the longitudinal direction of the vehicular body when said bumper reinforcement is attached to the vehicular body.

3. The bumper structure according to claim 2, wherein said first impact absorption member and said second impact absorption member are produced by performing double injection molding such that said first and second impact absorption members are integral with one another.

4. The bumper structure according to claim 2, wherein said second impact absorption member is of a material stronger than material of said first impact absorption.

5. The bumper structure according to claim 4, wherein said impact absorber has a front surface, with said front surface at said upper side of said impact absorber being substantially at the same position as that of said front surface at said lower side of said impact absorber member with regard to the longitudinal direction of the vehicular body when said bumper reinforcement is attached to the vehicular body.

6. The bumper structure according to claim 5, wherein said first impact absorption member and said second impact absorption member are produced by performing double injection molding such that said first and second impact absorption members are integral with one another.

7. The bumper structure according to claim 1, wherein said front surface portion of said bumper reinforcement has a tapered cross-sectional shape that gradually retreats in the longitudinal direction of the vehicular body, when said bumper reinforcement is attached to the vehicular body, from an upper side of said front surface portion to a lower side of said front surface portion, and
said impact absorber comprises a first impact absorption member and a second impact absorption member beneath said first impact absorption member, with said first and second impact absorption members each having a tapered rear surface facing said front surface portion of said bumper reinforcement, with said second impact absorption member being longer than said first impact absorption member and projecting toward said bumper reinforcement relative to said tapered rear surface of said first impact absorption member, and with said second impact absorption member being stronger than said first impact absorption member in the longitudinal direction of the vehicular body when said bumper reinforcement is attached to the vehicular body,
such that
(i) said tapered rear surface of said first impact absorption member and said tapered rear surface of said second impact absorption member define said rear surface portion of said impact absorber,
(ii) said impact absorber is longer at said lower side than at said upper side thereof, such that at said lower side said rear surface portion of said impact absorber projects rearwardly relative to said tapered rear surface portion at said upper side, by virtue of said second impact absorption member being longer than said first impact absorption member and projecting toward said bumper reinforcement relative to said rear surface of said first impact absorption member, and
(iii) said impact absorber is stronger at said lower side than at said upper side thereof by virtue of said second impact absorption member being stronger than said first impact absorption member in the longitudinal direction of the vehicular body when said bumper reinforcement is attached to the vehicular body.

8. The bumper structure according to claim 7, wherein said first impact absorption member and said second impact absorption member are produced by performing double injection molding such that said first and second impact absorption members are integral with one another.

9. The bumper structure according to claim 7, wherein said second impact absorption member is of a material stronger than material of said first impact absorption.

10. The bumper structure according to claim 9, wherein said impact absorber has a front surface, with said front surface at said upper side of said impact absorber being substantially at the same position as that of said front surface at said lower side of said impact absorber member with regard to the longitudinal direction of the vehicular body when said bumper reinforcement is attached to the vehicular body.

11. The bumper structure according to claim 10, wherein said first impact absorption member and said second impact absorption member are produced by performing double injection molding such that said first and second impact absorption members are integral with one another.

12. The bumper structure according to claim 1, wherein said bumper reinforcement has an upper side and a lower side, with said front surface portion of said bumper reinforcement projecting forward at said upper side relative to said lower side.

13. The bumper structure according to claim 1, wherein said impact absorber has a front surface, with said front surface at said upper side of said impact absorber being substantially at the same position as that of said front surface at said lower side of said impact absorber member with regard to the longitudinal direction of the vehicular body when said bumper reinforcement is attached to the vehicular body.

14. The bumper structure according to claim 1, wherein said impact absorber at said lower side is of a material that is stronger than material of said impact absorber at said upper side.

15. The bumper structure according to claim 14, wherein said bumper reinforcement has an upper side and a lower side, with said front surface portion of said bumper reinforcement projecting forward at said upper side relative to said lower side.

16. The bumper structure according to claim 15, wherein said impact absorber has a front surface, with said front surface at said upper side of said impact absorber being substantially at the same position as that of said front surface at said lower side of said impact absorber member with regard to the longitudinal direction of the vehicular body when said bumper reinforcement is attached to the vehicular body.

17. The bumper structure according to claim 1, wherein said impact absorber comprises first and second impact absorption members that are adhered to one another, with said second impact absorption member being beneath said first impact absorption member.

18. The bumper structure according to claim 17, wherein said second impact absorption member is of a material that is stronger than material of said first impact absorption member.

19. The bumper structure according to claim 18, wherein said bumper reinforcement has an upper side and a lower side, with said front surface portion of said bumper reinforcement projecting forward at said upper side relative to said lower side.

20. The bumper structure according to claim 19, wherein said impact absorber has a front surface, with said front surface at said upper side of said impact absorber being substantially at the same position as that of said front surface at said lower side of said impact absorber member with regard to the longitudinal direction of the vehicular body when said bumper reinforcement is attached to the vehicular body.

* * * * *